(12) United States Patent
Nakano et al.

(10) Patent No.: US 11,472,718 B2
(45) Date of Patent: Oct. 18, 2022

(54) ADSORPTION STRUCTURE, ADSORPTION STRUCTURE UNIT, AND METHOD FOR MANUFACTURING SAME

(71) Applicant: HITACHI METALS, LTD., Tokyo (JP)

(72) Inventors: Keiko Nakano, Tokyo (JP); Toshitaka Ishizawa, Tokyo (JP); Yoshio Katayama, Tokyo (JP); Atsuhiro Noguchi, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 371 days.

(21) Appl. No.: 16/607,900

(22) PCT Filed: Apr. 19, 2018

(86) PCT No.: PCT/JP2018/016064
§ 371 (c)(1),
(2) Date: Oct. 24, 2019

(87) PCT Pub. No.: WO2018/198915
PCT Pub. Date: Nov. 1, 2018

(65) Prior Publication Data
US 2020/0048110 A1    Feb. 13, 2020

(30) Foreign Application Priority Data
Apr. 26, 2017    (JP) ................. JP2017-087394

(51) Int. Cl.
*C02F 1/28*    (2006.01)
*B01J 20/28*    (2006.01)
*B01J 20/30*    (2006.01)

(52) U.S. Cl.
CPC ......... *C02F 1/281* (2013.01); *B01J 20/28045* (2013.01); *B01J 20/30* (2013.01)

(58) Field of Classification Search
None
See application file for complete search history.

(56) References Cited

U.S. PATENT DOCUMENTS

2005/0272602 A1*  12/2005  Ninomiya ........... C04B 41/5089
                                                     502/439
2008/0190083 A1*   8/2008  Oshimi ................... B01J 35/04
                                                       55/521

(Continued)

FOREIGN PATENT DOCUMENTS

EP    1857427 A1    11/2007
JP    55-114324 A    9/1980

(Continued)

OTHER PUBLICATIONS

Extended European Search Report dated Nov. 23, 2020 for European Patent Application No. 18790116.0.

(Continued)

*Primary Examiner* — Chester T Barry
(74) *Attorney, Agent, or Firm* — Volpe Koenig (57) ABSTRACT

An adsorption structure unit prevents water leakage from an adsorption structure and improves the durability of the adsorption structure and the durability of the adsorption structure unit. An adsorption structure has a filter portion having a plurality of flow paths divided by a plurality of partition walls and a plugged portion shutting a feed water inflow or outflow end of the plurality of flow paths, a water-impermeable outer tube accommodating the filter portion, and a seal material blocking a gap between the filter portion and the outer tube in at least one end portion of the filter portion. An adsorption structure unit has the adsorption structure, a housing supplying feed water from one end of the adsorption structure, and discharging the feed water from the other end, and a ring member disposed between end (Continued)

portions on both sides of the outer tube and an inner surface of the housing.

8 Claims, 7 Drawing Sheets

(56) References Cited

U.S. PATENT DOCUMENTS

| | | |
|---|---|---|
| 2009/0011176 A1 | 1/2009 | Ichikawa |
| 2009/0136710 A1 | 5/2009 | Ichikawa |
| 2013/0255238 A1* | 10/2013 | Murakami ............ F01N 3/2842 60/299 |
| 2017/0197168 A1* | 7/2017 | Shibata .................. C04B 38/00 |

FOREIGN PATENT DOCUMENTS

| | | |
|---|---|---|
| JP | 2002-224505 A | 8/2002 |
| JP | 2004-270688 A | 9/2004 |
| JP | 2012-91151 A | 5/2012 |
| JP | 2012-153538 A | 8/2012 |
| JP | 2012-229700 A | 11/2012 |
| JP | 2016-198742 A | 12/2016 |
| WO | 2006/095835 A1 | 9/2006 |
| WO | 2007/148764 A1 | 12/2007 |
| WO | 2015/199017 A1 | 12/2015 |

OTHER PUBLICATIONS

International Search Report PCT/JP2018/016064, dated Jul. 10, 2018.

* cited by examiner

| | WATER TIGHTNESS | | DURABILITY |
|---|---|---|---|
| | HOUSING-CERAMICS FILTER | OUTER PERIPHERAL PORTION (AT INTERNAL PRESSURE OF 0.05 kPa) | DAMAGE TO OUTER PERIPHERAL PORTION |
| CONVENTIONAL EXAMPLE | ○ | × (WATER LEAKAGE) | × (CRACKING OCCURRED IN 1st OR 2nd WEEK) |
| 1st EMBODIMENT | ○ | ○ | ○ |
| 2nd EMBODIMENT | ○ | ○ | ○ |
| 3rd EMBODIMENT | ○ | ○ | ○ |

ADSORPTION STRUCTURE, ADSORPTION STRUCTURE UNIT, AND METHOD FOR MANUFACTURING SAME

TECHNICAL FIELD

The present invention relates to an adsorption structure, an adsorption structure unit, and a method for manufacturing the same and, more particularly, to a ceramic filter for water treatment used for adsorption-based contaminant removal, a ceramic filter unit, and a method for manufacturing the same.

BACKGROUND ART

A water treatment system using a reverse osmosis membrane has been put to practical use in advanced treatment for water purification. The reverse osmosis membrane is a type of separation membrane and contaminants deposited on the separation membrane are removed by a regular flow of a washing liquid through the surface of the membrane. Usually, the reverse osmosis membrane gradually deteriorates due to the washing liquid, and thus reverse osmosis membrane modules are exchanged. It necessary to stop the water treatment operation for a long time during the reverse osmosis membrane module exchange. In addition, the reverse osmosis membrane module cannot be recycled, and thus replacement with a new reverse osmosis membrane module becomes necessary. These necessities lead to a decline in capacity utilization and an increase in running costs per unit water quantity such as waste disposal costs and reverse osmosis membrane-related consumables costs.

Proposed in this regard is a technique for achieving an extension in life until reverse osmosis membrane exchange by adding a pretreatment process of pre-removing contaminants such as organic matter ahead of the reverse osmosis membrane. For example, Patent Document 1 discloses a honeycomb-shaped adsorption structure provided with an outer wall, a plurality of flow paths provided inside the outer wall, and a partition wall separating the flow paths. The thickness of partition wall is smaller than the diameter of the flow path. The adsorption structure performs organic matter adsorption by having interconnected pores allowing communication between the flow paths. Unlike particulate adsorption materials, this adsorption structure has no fluidity. Accordingly, this adsorption structure is advantageous in terms of maintenance work convenience such as exchange convenience and cost reduction can be achieved as a result.

CITATION LIST

Patent Document

Patent Document 1: JP 2012-91151 A

SUMMARY OF THE INVENTION

Problems to be Solved by the Invention

What matters for the purpose of water treatment capacity utilization enhancement is to extend the duration of use of the adsorption structure as much as possible (durability), facilitate the replacement of the adsorption structure stored in a housing, and shorten the time required for the replacement as much as possible. What is desirable for the purpose of water purification rate improvement, that is, for purpose of improving the adsorption rate of the adsorption structure is a structure in which no water leaks from the adsorption structure by feed water being passed through the honeycomb-shaped adsorption structure without exception.

Usually, outer and partition walls of an adsorption structure are formed of ceramic as disclosed in Patent Document 1. The outer wall is a dense yet water-permeable structure. During a normal operation, water leakage from the side surface of the adsorption structure is prevented by the surface tension of the water that is contained in the outer wall. However, water leakage from the side surface occurs due to the differential pressure in and out of the outer wall when the internal pressure of the adsorption structure increases as a result of clogging the adsorption structure or operating condition. Further, although both the dense outer wall and the porous partition wall are made of ceramic in general, the outer and partition walls may be different in material and strength and the underwater strength of the outer wall may be lower than the strength of the outer wall that is dried. A packing such as an O-ring is provided between the housing and the outer wall portion of the adsorption structure so that the adsorption structure is held. When the adsorption structure is used for a long time in water, the outer wall may crack due to the surface pressure of the O-ring and water may leak into the housing from the side surface of the adsorption structure. Once breaking occurs in the outer wall of the adsorption structure, the duration of use of the adsorption structure is shortened, the frequency of replacement of the adsorption structure is increased, and a decline in capacity utilization ensues. Besides, the water leakage from the side surface of the adsorption structure results in a decline in the adsorption performance of the adsorption structure.

In view of the situation described above and in order to improve the durability of the adsorption structure, the present inventors studied how to prevent the breaking of the adsorption structure, the breaking of the outer wall in particular, and how to prevent water leakage from the adsorption structure.

An object of the present invention is to prevent water leakage from an adsorption structure and improve the durability of the adsorption structure and the durability of an adsorption structure unit.

Solutions to Problems

According to a preferred example, an adsorption structure according to the present invention includes a filter portion having a plurality of flow paths divided by a plurality of partition walls and a plugged portion shutting a feed water inflow end or a feed water outflow end of the plurality of flow paths, a water-impermeable outer tube accommodating the filter Portion, and a seal material blocking a gap between the filter portion and the outer tube in at least one end portion of the filter portion.

Preferably, an adsorption structure unit according to the present invention includes the adsorption structure configured as described above, a housing storing the adsorption structure, supplying feed water from one end of the adsorption structure, and discharging the feed water from the other end, and ring members disposed between end portions on both sides of the outer tube and an inner surface of the housing.

Preferably, a method for manufacturing an adsorption structure according to the present invention includes a cutting process of cutting out a part having a predetermined dimension from a tubular filter portion having multiple flow paths divided by multiple partition walls, the partition wall forming an outer wall, a plugged portion formation process of loading a plugged portion at one end on either one end side or the other end side of the filter portion formed as a result of the cutting process, a loading process of loading the filter portion into a water-impermeable outer tube after the plugged portion formation process, and a seal material disposition process of disposing a seal material between the outer tube and the filter portion.

Preferably, a method for manufacturing an adsorption structure unit according to the present invention includes a storage process of storing the adsorption structure manufactured by the manufacturing method described above in a housing supplying feed water from one end and discharging the feed water from the other end and a disposition process of disposing ring members between end portions on both sides of the outer tube and an inner surface of the housing.

Effects of the Invention

According to the present invention, it is possible to realize watertightness for an adsorption structure unit by preventing water leakage from an adsorption structure and the durability of the adsorption structure and the durability of the adsorption structure unit are improved.

MODE FOR CARRYING OUT THE INVENTION

Preferred configurations of an adsorption structure and an adsorption structure unit according to the present invention will be schematically described before embodiments of the present invention are described.

A ceramic filter portion and a water-impermeable outer tube storing the filter portion constitute the adsorption structure such as a ceramic filter for water treatment. The adsorption structure unit is configured by the adsorption structure being stored in a housing.

Preferably, a ceramic honeycomb structure can be used for the filter portion. The filter portion has a plurality of flow paths and a porous ceramic partition wall the separating adjacent flow paths. The plurality of flow paths are disposed such that the cross sections of the plurality of flow paths are closely arranged on the end surfaces of the flow paths, and the end surfaces on an inflow side or an outflow side are formed so as to be plugged with each other. Specifically, the filter portion has a first flow path and a second flow path. As for the first flow path, the inflow end for water before treatment is open and the outflow end for water after treatment on the opposite side is shut by a plugged portion. As for the second flow path, the outflow end for water after treatment is open and the inflow end for water before treatment on the opposite side is shut by a plugged portion. The first flow path and the second flow path are alternately disposed. With such a structure, feed water introduced to the surface of the inflow-side end of the filter portion always passes through the inner portion of the Partition wall and contaminants contained in the water are adsorbed and removed on the surfaces of pores in the porous ceramic partition wall.

In the adsorption structure, the outer tube is a water-impermeable member, and thus water leakage from the side surface of the adsorption structure into the housing can be prevented. The outer tube and the filter portion are separate members, and thus a ceramic-less gap is generated with the outer tube and the filter portion as they are. In a case where the feed water escapes from the inflow-side end surface to the outflow-side end surface through the gap, the feed water does not pass through the inner portion of the partition wall. Then, the contaminants are discharged without adsorption removal and the performance of the adsorption structure is not sufficiently exhibited. Accordingly, at least one end of the filter portion is provided with a seal material disposed in the gap with the outer tube so that the feed water always passes through the partition wall. The seal material combines and integrates the outer tube and the filter portion as a ceramic filter for water treatment and prevents the feed water from penetrating the gap between the side surface of the filter portion and the outer tube. Accordingly, it is preferable that the seal material is embedded up to at least the outside surface of the filter portion.

Although one or both ends of the filter portion are provided with the seal material in the present invention, it is possible to prevent the stagnation of the water that flows into the gap between the outer tube and the filter portion by providing the seal material only at one end. In an example in which water is passed upward from below during adsorption and downward from above during backwashing, the volume of the partition wall increases by the partition wall on the side surface of the filter portion contributing to the adsorption and an adsorption performance improvement effect can be anticipated as a result in a case where the seal material is provided only at the upper end. In a case where the seal material is provided only at the lower end in the same example, the inflow-side partition wall area increases with respect to the outflow-side partition wall area during the backwashing, and thus an inter-partition wall differential pressure can be obtained and washing performance improvement can be anticipated. Although the seal material can be provided at both ends or on the entire outer peripheral side surface of the filter portion, the filter portion and the outer tube can be firmly integrated by the seal material being provided in both end portions or on the entire outer peripheral side surface, and then the filter portion and the outer tube are not separated even in a case where an increase in internal pressure has occurred by the filter portion changing with time. However, the water flowing into the gap between the filter portion and the outer tube may stagnate and deteriorate in water quality, and then the water quality of the water passing through the inner portion of the filter portion may be adversely affected. Accordingly, it is necessary to minimize the gap between the filter portion and the outer tube to the maximum extent possible.

As for the adsorption structure unit, ring members are disposed between the end portions on both sides of the outer tube of the adsorption structure and the inner surface of the housing. The outer tube preferably has a length exceeding the total length of the filter portion and both ends of the outer tube may be flat surfaces. As a result, sealing with the housing in which the adsorption structure is stored can be ensured on both end surfaces of the outer tube. Both end surfaces of the outer tube are flat surfaces for watertightness enhancement. Accordingly, it is possible to use a solid rubber-shaped packing or O-ring for the ring member for watertightness obtainment, and thus the outer tube portion and the filter portion in the housing can be easily removed and excellent exchangeability can be obtained as an effect.

The seal material as well as the outer tube prevents water leakage from the filter portion, and thus a filter portion with high adsorption efficiency can be realized. The ring member forms a sealed structure with the housing by hitting the end portion of the outer tube without blocking the flow path of the filter portion, and thus the original adsorption efficiency of the filter portion can be maintained. Further, since the force for sealing with the housing is applied to the outer tube and not applied to the filter portion, the filter portion is unlikely to undergo breaking such as cracking. As a result, it is possible to improve the durability of the adsorption structure or the adsorption structure unit.

Hereinafter, several embodiments will be described with reference to the drawings.

FIRST EMBODIMENT

A first embodiment will be described with reference to FIGS. 1A, 1B, and 2.

[Configuration of Ceramic Filter]

Figure 1A:
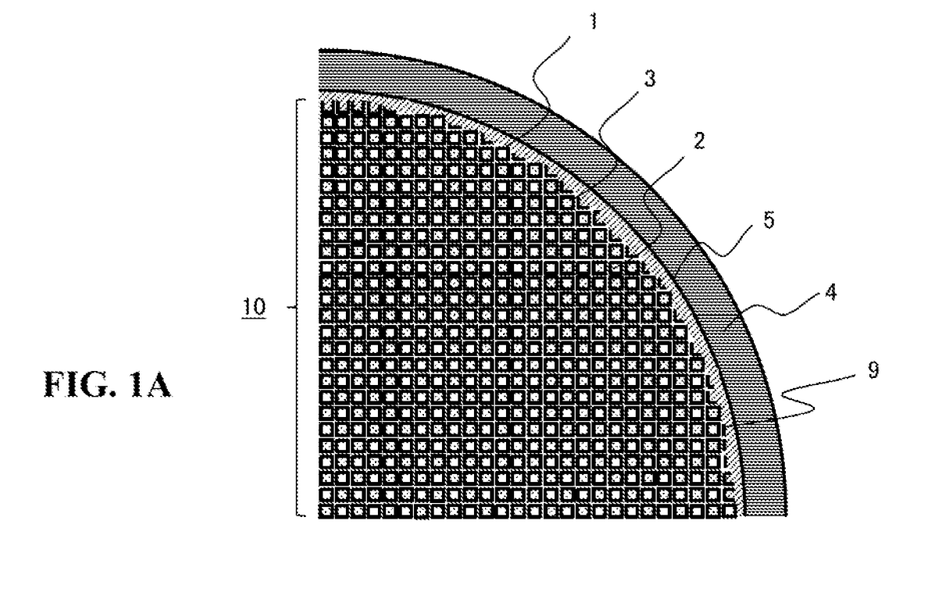
FIGS. 1A and 1B are diagrams illustrating a ceramic filter according to a first embodiment.
Figure 1B:
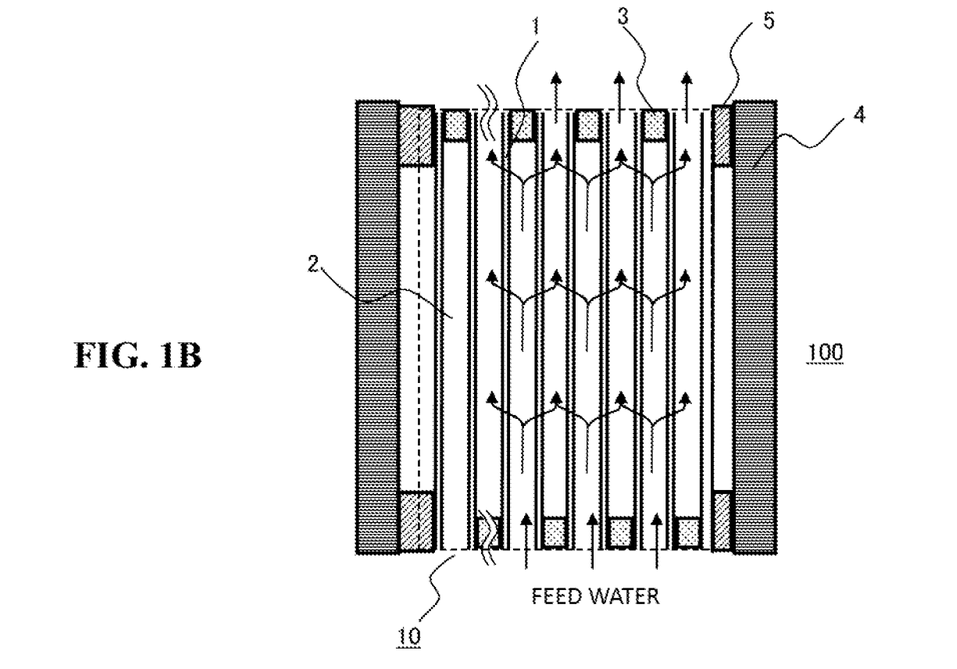

FIGS. 1A and 1B illustrate a ceramic filter according to the embodiment. FIG. 1A is a top view schematically illustrating a 90-degree range from the center of the upper end surface of a filter portion and FIG. 1B is a cross-sectional view in a flow path longitudinal direction. A filter portion 10 and an outer tube 4 storing the filter portion 10 constitute a ceramic filter 100. Multiple flow paths 2 divided by a partition wall 1 are arranged in the ceramic filter. The partition wall 1 is formed of porous ceramic having a porosity of 50%, desirably 60% or more, for pressure loss reduction. Conceivable as the material of the porous ceramic are cordierite, alumina, silica, magnesia, titania, and so on. The material of the porous ceramic is not limited to the above insofar as a porous filter can be formed. Preferable are cordierite and alumina, which are small in coefficient of thermal expansion and can be easily molded.

During water passage through the inner portion of the partition wall 1, water purification is performed by adsorption on the surfaces of pores in the porous ceramic partition wall, and thus the partition wall 1 may carry an adsorption material for adsorption performance improvement. Conceivable as the adsorption material are microcrystals or fine particles of the ceramic described above or a resin material such as nylon, aramid, polyamide, cellulose, and polyethylene. The material may be selected in accordance with a removal target substance since the adsorption is selective. The thickness in a case where the adsorption material is carried may be to such an extent that the pressure loss at the time of use for water treatment is not problematic. Specifically, an average film thickness equal to or less than 1/10 of the average pore diameter of the partition wall is preferable.

Here, the average pore diameter is a pore diameter at which a cumulative pore volume reaches 50% of a total pore volume with a horizontal axis representing the pore diameter and a vertical axis representing the cumulative pore volume by a pore diameter distribution measurement method such as a mercury porosimeter. The average film thickness is obtained by a volume obtained from the amount (weight) by which the adsorption material is carried and the specific gravity of the adsorption material being divided by the specific surface area of the filter measured by means of a mercury porosimeter or the like. The average pore diameter may be 1 μm to 50 μm. The average pore diameter is preferably 5 μm to 30 μm in terms of a small pressure loss during water passage and the ease of molding.

Although the end surface-side cross-sectional shape of the flow path 2 is square in FIGS. 1A and 1B, the shape may be triangular, rectangular, hexagonal, a combination thereof, or the like without being limited insofar as a regular arrangement is possible. Since adsorption is performed on the wall surfaces of the pores in the porous partition wall, plugged portions 3 are alternately provided in the inflow- and outflow-side flow paths 2 as illustrated in FIG. 1B, which is a cross-sectional view in the flow path longitudinal direction, such that the water supplied to the filter portion 10 passes through the partition wall inner portion. As illustrated in FIG. 1A, which illustrates an end surface side, the plugged portions 3 are alternately arranged when viewed from the end surface. Here, an equivalent diameter De of the flow path 2 is defined as De=4 Af/Wp. Here, Af is the cross-sectional area of the flow path and Wp is a wet edge length and is the total length of flow path sides. In the case of a square shape as illustrated in FIGS. 1A and 1B, the equivalent diameter De corresponds to the length of one side.

[Method for Manufacturing Ceramic Filter]

Next, a method for manufacturing the ceramic filter 100 will be described.

First, the partition wall 1 and the flow path 2 are molded by ceramic slurry extrusion from a mold and cutting into a cylindrical ceramic filter structure is performed after extrusion to a predetermined length. The cylindrical filter is dried and fired, and then the filter portion 10, in which an outer peripheral portion 9 has a porous outer wall made of the same material as the partition wall 1 as illustrated in FIGS. 1A and 1B, is completed. Subsequently, a slightly smaller cylindrical filter is cut out so that specified dimensions are met. The diameter of the cut-out cylinder at that time is R, which is the outermost portion of the filter.

Next, slurry having a composition for manufacturing a dense and non-porous ceramic sintered body is alternately inserted into the flow paths 2 so that the plugged portions 3 are formed. The cylindrical filter is dried and fired, and then the plugged portions 3 are formed on both end surfaces of the cylindrical filter. Here, the material of the plugged portions 3 is not limited to ceramic and the same material as the seal material to be described later can be used insofar as no water permeation occurs at a maximum pressure during water passage of 0.2 MPa, little elution occurs in the feed water or a chemical used for washing, and the quality of treated water is not adversely affected. The cylindrical filter may be cut out after the formation of the plugged portion 3.

Next, the filter portion 10 formed as described above is inserted into the outer tube 4 and a seal material 5 is embedded between the filter portion 10 and the outer tube 4. The ceramic filter 100 is formed as a result. The seal material 5 is provided so that the feed water is prevented from passing through the gap between the outer tube 4 and the filter portion without passing through the partition wall 1. The seal material 5 can be selected from a sealing agent, an adhesive, a caulking material, and so on. In this case, a silicone-based seal material, an epoxy-based seal material, and an acrylic seal material are preferable in terms of the chemical resistance, water impermeability, and embedding workability of the seal material 5.

In the present embodiment, the seal material 5 is installed on both end surfaces of the ceramic filter 100. The outer tube 4 and the filter portion 10 are held more firmly when the seal material 5 is provided on both end surfaces than when the seal material 5 is provided in one end portion, and thus the durability of the ceramic filter is improved and the ceramic filter can be used for a long-time operation. The water that has permeated the porous partition wall in the outermost portion of the filter portion 10 is likely to stagnate between the outer tube 4 and the filter portion 10. Once metabolites released as a result of the growth of microorganisms in the stagnant water intrude into the filter portion 10 through the partition wall, the quality of treated water may be deteriorated. Accordingly, the stagnation should be avoided. The present inventors conducted studies and found that liquid exchange proceeds and water stagnation between the filter portion 10 and the outer tube 3 does not affect the quality of treated water, even in the event of water flow into the space between the outer tube 4 and the filter portion 10, when water passes through the flow path of the filter portion in a case where the difference between the cylinder diameter R of the filter portion 10 and the diameter of the inner peripheral portion of the outer tube is up to twice the equivalent diameter De of the flow path 2, that is, in a case where the gap between the inner peripheral portion of the outer tube 4 and the outermost portion of the filter portion 10 is smaller than the equivalent diameter De of the flow path of the filter portion 10. Accordingly, it is preferable that the gap between the inner peripheral portion of the outer tube 4 and the outermost portion of the filter portion 10 is smaller than the equivalent diameter of the flow path 2 in the filter portion.

In the present embodiment, the seal material 5 is embedded after the filter portion 10 is inserted into the outer tube, and thus the seal material 5 is embedded by approximately 5 mm in the flow path longitudinal direction as illustrated in FIG. 1B. However, the depth of the embedding is not particularly limited. A configuration in which the seal material 5 is applied in advance to the periphery and outside surface of the filter portion 10 as a whole and then the filter portion 10 is inserted into the outer tube 4 is also possible for the outer tube 4 and the filter portion 10 to be firmly integrated and water flow into the gap between the inner peripheral portion of the outer tube 4 and the outermost portion of the filter portion 10 to be prevented. At this time, it is preferable to select one of the silicone-based, epoxy-based, and acrylic seal materials that is solvent-free and is not reduced in volume when cured.

Considering the manufacturing workability of the ceramic filter, the same structure as in FIG. 1B may be obtained by the seal material 5 being attached in advance to the end portion of the filter portion 10 where the plugged portion 3 is formed, the filter portion 10 being loaded into the outer tube 4, and the seal material 5 being fixed to the outer tube 4.

[Configuration of Ceramic Filter Unit]

The configuration of a ceramic filter unit as an example of the adsorption structure unit will be described with reference to FIG. 2.

The ceramic filter 100 described above and a housing 30, which is a container storing the ceramic filter 100, constitute the ceramic filter unit. A pair of an upper side housing 31 and a lower side housing 32 constitute the housing 30. A flange 311 of the upper housing 31 and a flange 321 of the lower housing 32 are fixed and integrated by means of a bolt (not illustrated). It is preferable that the material of the housing 30 is a seawater-resistant and alkali-resistant material such as rigid polyvinyl chloride (PVC), polyethylene (PE), and SUS.

In the present embodiment, a ring member 61 is disposed between the upper housing 31 and the upper end surface of the outer tube 4 of the ceramic filter 100 and a ring member 62 is disposed between the lower housing 32 and the lower end surface of the outer tube 4 (here, the ring member 61 and the ring member 62 are collectively referred to as the ring member 6 in some cases). The watertightness of the inner portion of the housing 30 is ensured as a result. Further, a firmer watertight structure is formed by a ring member 33 being loaded between the flanges 311 and 321.

Here, it is preferable that both end surfaces of the outer tube 4 are flat surfaces such that the outer tube 4 and the ring member 6 are in close contact with each other. Here, the flat surface may mean a surface that has flatness to such an extent that no gap is generated with respect to the ring member that is used. In one example, rigid polyvinyl chloride (PVC) standard piping was cut and the cut surface was polished with a file. The outer tube 4 may be longer in length than the filter portion 10 such that the ring member 6 hits only the end surface of the outer tube 5 without hitting the filter. Used in one example was the outer tube 4 that is 1 mm longer in total length than the filter portion 10. Considering the machining dimensional accuracy of the filter portion and the machining dimensional accuracy of the outer tube, a length that does not exceed the total length of the filter portion may be selected as the length of the outer tube 4.

It is preferable that the outer tube 4 has a thickness of 3 mm or more so that close contact with the ring member is ensured. In one example, PVC piping having a thickness of 7.0 mm was used. As for a material of the outer tube 4, it is preferable that the outer tube 4 is metallic or resinous in order to be stable with respect to the feed water that is used in the ceramic filter and ensure water impermeability. Particularly preferable in the case of metal are highly corrosion-resistant materials such as SUS304 and SUS316 and particularly preferable in the case of resin are rigid PVC, polyethylene (PE), polypropylene (PP), nylon (PA), and the like. This is because a sodium hydroxide aqueous solution is used for chemical washing used for in-line recovery of adsorption performance or seawater.

A packing or an O-ring can be used for the ring member 6. If necessary, a positioning groove may be provided at a corresponding place of the housing or the outer tube 4. From the viewpoint of chemical resistance, nitrile rubber, chloroprene rubber, ethylene propylene rubber, ethylene propylene diene rubber, fluororubber, and silicone rubber are preferable as the material of the ring member 6 The shape of the ring member 6 can be selected from flat packings, O-rings, and so on.

In the ceramic filter unit configured as described above, the watertight structure that is formed by the ring member 6 disposed between the outer tube 4 and the housing 30 prevents the water that has passed through the filter portion 10 from leaking out of the watertight structure. Even in the event of water leakage to the outside of the outer tube 4 of the ceramic filter 100, the ring member 33 disposed between the housings 31 and 32 are capable of preventing water leakage to the outside of the housing 30.

A decline in adsorption performance arises, due to organic matter adsorption on the filter portion 10 or the like, as the ceramic filter unit continues to be used. Then, the ceramic filter 100 needs to be replaced. In this case, the already used ceramic filter 100 is taken out by the bolt fixed to the flanges 311 and 321 of the housing 30 being removed and the ceramic filter unit is regenerated by the already used ceramic filter 100 being replaced with the ceramic filter 100 that is new.

Although one ceramic filter for water treatment is stored in one housing in the present embodiment, also possible is a configuration in which a plurality of the ceramic filters for water treatment are stacked and stored in one housing via the ring member 6.

SECOND EMBODIMENT

Figure 3A:
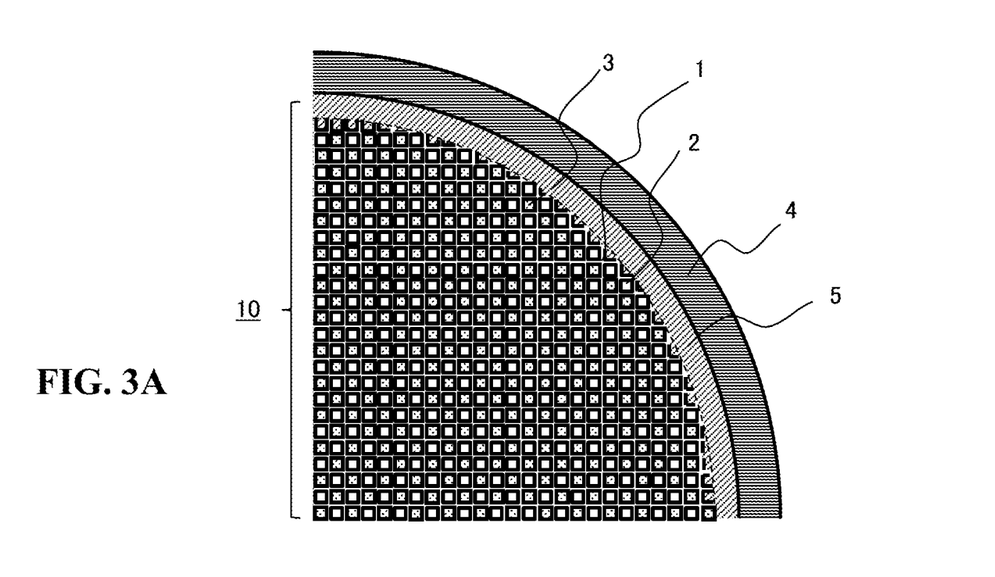
FIGS. 3A and 3B are diagrams illustrating a ceramic filter according to a second embodiment.
Figure 3B:
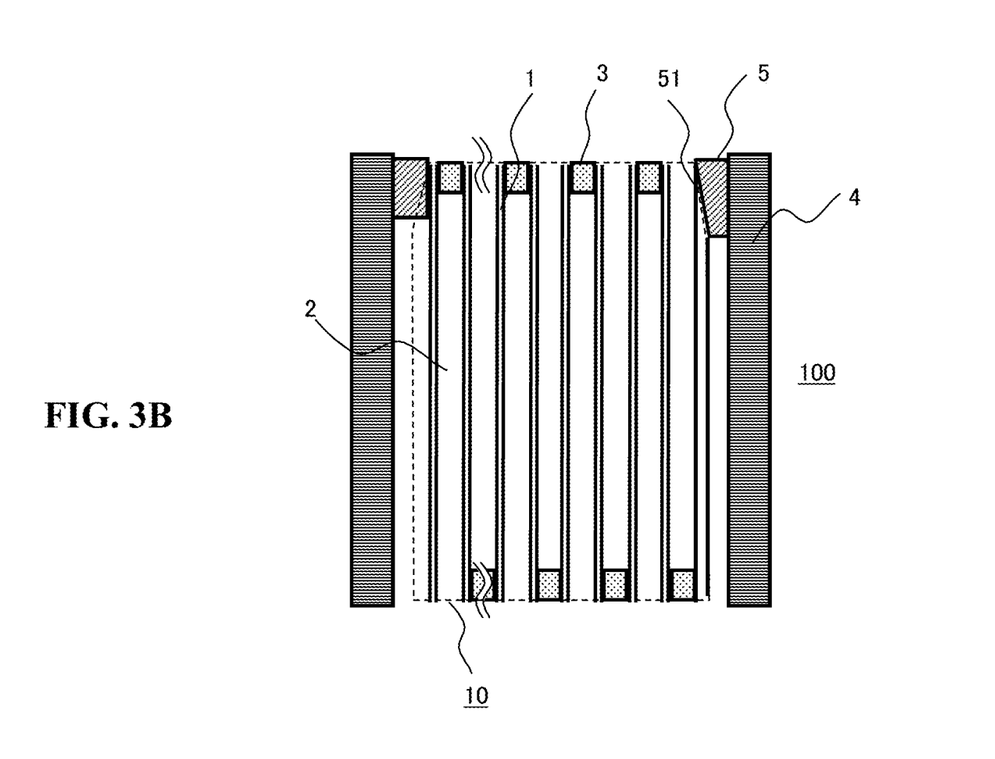

Next, a second embodiment will be described with reference to FIGS. 3A and 3B.

The material of the filter portion, the material of the seal material, the material of the outer tube, and the configurations of the housing and so on in the present embodiment are identical to those in the first embodiment.

A chamfered portion 51 is formed by the upper surface end portion of the filter portion 10 formed up to the plugged portion 3 being ground by means of a grinder and chamfering into a tapered shape being performed. At this time, the upper surface end portion is ground by 2 mm in the radial direction of the end surface and 10 mm in the longitudinal direction of the flow path. Subsequently, the filter portion 10 is inserted into the outer tube 4 and the seal material 5 is embedded between the filter portion 10 and the outer tube 4 as in Embodiment 1. The adhesion area between the seal material and the filter is increased by the chamfered portion 51 being formed. As a result, the adhesive strength between the seal material and the filter is enhanced. Further, the work efficiency of the embedding with the outer tube is improved. The embedding work will be described here. During the embedding work, the seal material is injected by a nozzle that has a tip hole hitting a part to be embedded. The gap between the outer tube and the filter portion may be equal to or less than the equivalent diameter De, less than 1 mm, and smaller than the hole diameter of the nozzle while the hole diameter at the tip of the nozzle is 1 mm or more from an injection amount relationship. Once the embedding work is performed in this state, the tip of the nozzle is lifted from the end surface of the filter portion 10 and the outer tube 4, and thus the seal material cannot be sufficiently pushed into the gap between the filter portion and the outer tube. When the chamfering length of the tapered portion is longer than the hole diameter at the tip of the nozzle, the nozzle can be inserted to a portion below the end surface of the filter portion 10 and the outer tube 4 and the efficiency of the embedding work is improved. Also in the present embodiment, the seal material 5 is embedded up to the outside surface of the chamfered filter portion. Preferable in the interest of efficiency improvement is a chamfering amount in the radial direction of the end surface that exceeds the nozzle diameter during the seal material embedding. The volume of the partition wall contributing to the adsorption performance decreases and stagnation is likely to occur as the chamfering amount increases. Accordingly, the chamfering amount may be minimized as much as possible.

Although the seal material 5 is embedded with the chamfered portion 51 formed in the upper surface end portion of the filter portion 10 in this example, the chamfered portion 51 may be formed in the lower surface end portion of the filter portion 10 or both side end portions of the filter portion 10. The place where the seal material 5 is embedded is not limited to the chamfered portion 51 and the seal material 5 may be embedded at a part that is not chamfered.

THIRD EMBODIMENT

Figure 4A:
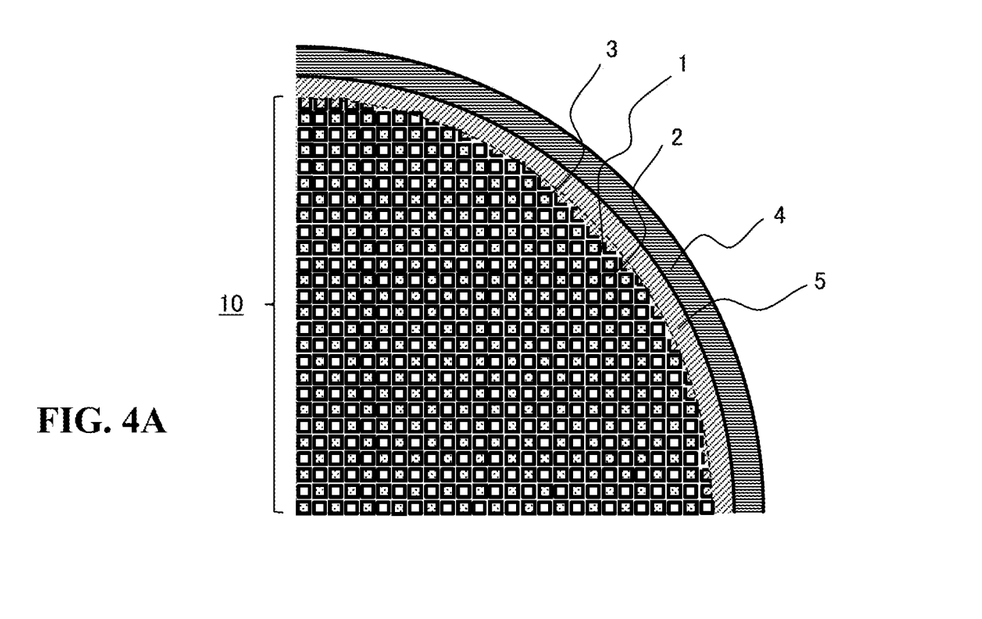
FIGS. 4A and 4B are diagrams illustrating a ceramic filter according to a third embodiment.
Figure 4B:
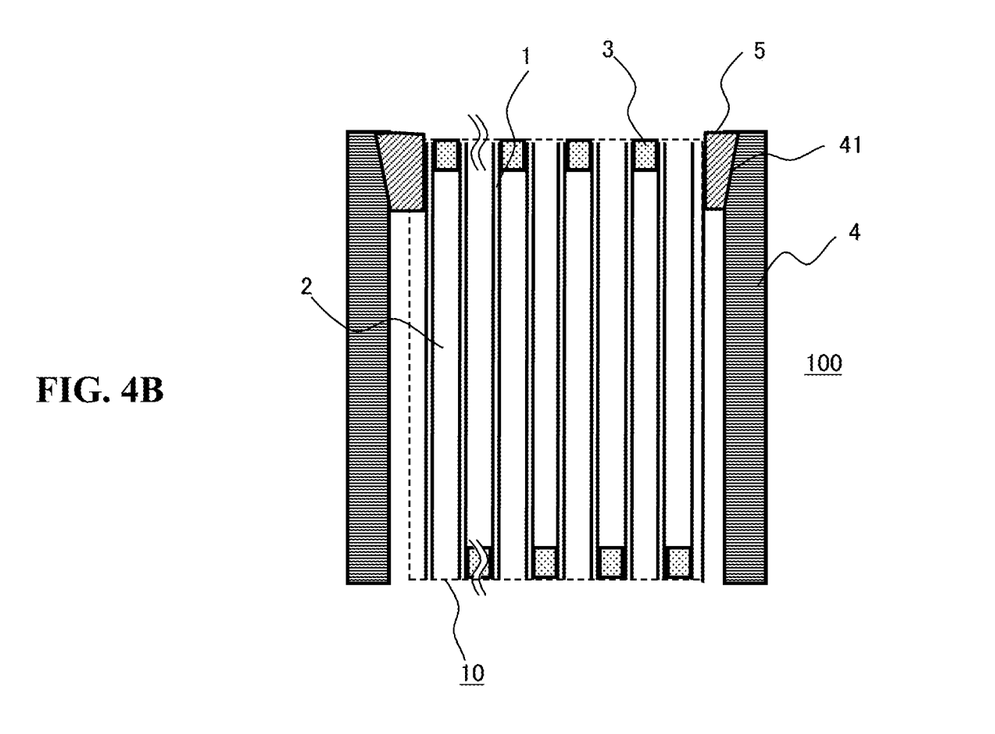

Next, a third embodiment will be described with reference to FIGS. 4A and 4B.

The material of the filter portion, the material of the seal material, the material of the outer tube, and the configurations of the housing and so on in the present embodiment are identical to those in the first embodiment.

A chamfered portion 41 is formed by the inner peripheral portion of the upper surface of the outer tube 4 being ground by means of a grinder and chamfering into a tapered shape being performed. At this time, the inner peripheral portion of the upper surface is ground by 2 mm in the radial direction and 10 mm in the longitudinal direction. Subsequently, the filter portion 10 is inserted into the outer tube 4 and the seal material 5 is embedded between the filter portion 10 and the outer tube 4 as in the first embodiment. The adhesion area between the seal material and the outer tube portion is increased by the chamfered portion 41 being formed. As a result, the adhesive strength is enhanced and the work efficiency of the embedding is improved. Also in the present embodiment, the seal material 5 needs to be embedded up to the outside surface of the chamfered filter portion. Preferable in the interest of efficiency improvement is a chamfering amount in the radial direction of the inner peripheral portion that exceeds the nozzle diameter during the seal material embedding. The area of contact with the ring member 6 for ensuring watertightness with the housing 30 decreases as the chamfering amount increases, and thus the width of the end surface of the upper portion after chamfering may be kept to an amount that is left by at least 3 mm. Since the filter portion 10 is not ground, the original adsorption performance is less likely to be impaired than in the second embodiment. However, it is necessary to leave the width of the end surface of the upper portion of the outer tube 4 by 3 mm or more, and thus the present embodiment is effective in a case where the outer tube has a large thickness.

Although the seal material 5 is embedded with the chamfered portion 41 formed in the upper surface end portion of the outer tube 4 in this example, chamfered portion 41 may be formed in the lower surface end portion of the outer tube 4 or both side end portions of the outer tube 4. The place where the seal material 5 is embedded is not limited to the chamfered portion 41 and the seal material 5 may be embedded at a part that is not chamfered.

[Application Example]

An example of a seawater desalination system that desalinates seawater by using a reverse osmosis membrane will be described as a water treatment system to which the ceramic filter unit according to any one of the embodiments described above is applied. The ceramic filter unit is not limited to the seawater desalination system using the reverse osmosis membrane. For example, the ceramic filter unit is also applicable to a desalination system using a nanofiltration membrane (NF membrane) or an ion exchange resin/membrane, a reused water production system using these membranes and producing reused water by purifying wastewater, and a pure or ultrapure water production system producing pure or ultrapure water. In addition, the ceramic filter unit can be used alone for water purification, other solution purification, and organic matter collection purposes as well as pretreatment for membrane treatment.

Figure 5:
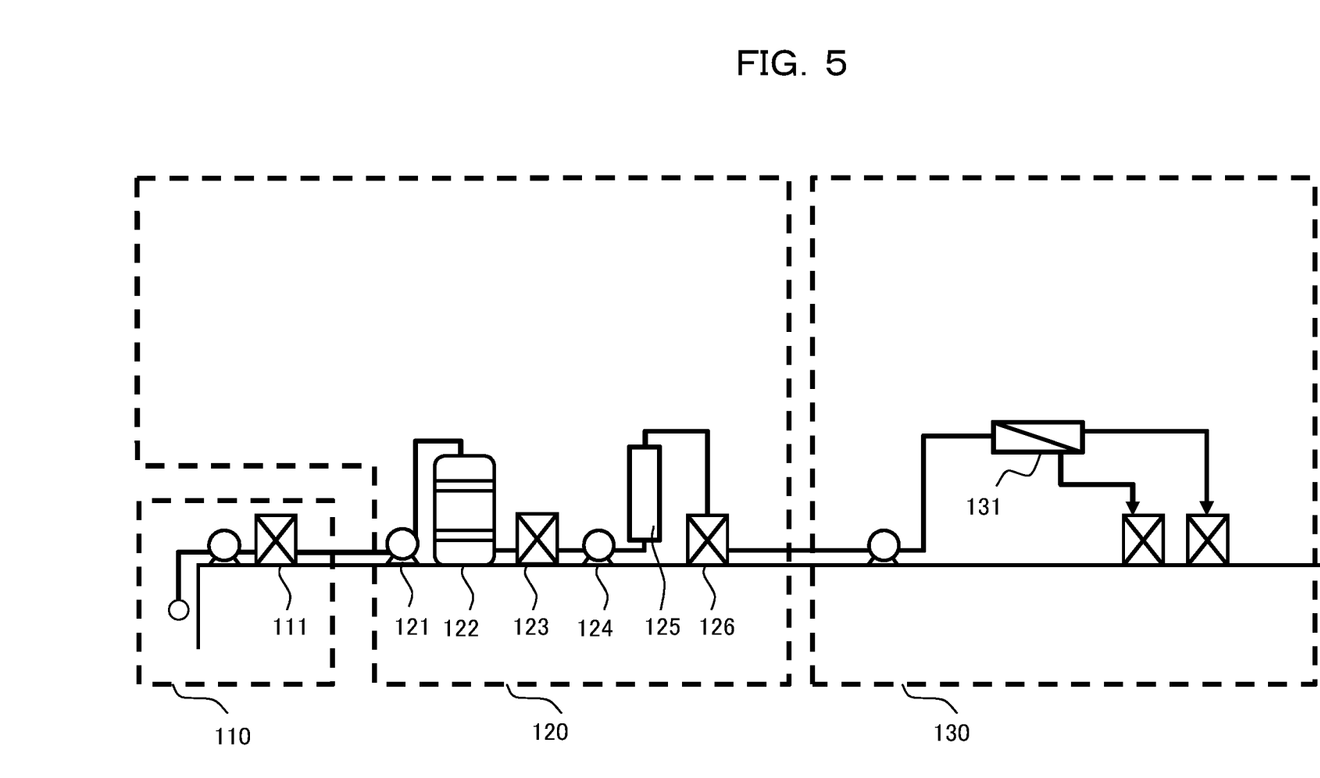
FIG. 5 is a diagram illustrating the flow of a seawater desalination system.

FIG. 5 is a flow diagram of the seawater desalination system. The seawater desalination system according to the present example, which is a water treatment system performing desalination by removing salt and impurities from seawater, is mainly constituted by three parts in the order of a seawater intake unit 110, a pretreatment unit 120, and a desalination unit 130 from the upstream side. The pretreatment unit 120 is constituted by a pump 121 for sending feed water to the pretreatment unit from a seawater tank 111 in the seawater intake unit, a sand filtration unit 122 for roughly removing particulate components ahead of the ceramic filter for water treatment, a feed water tank 123 storing the water after the sand filtration, a pump 124 for sending the feed water from the feed water tank 123 to the ceramic filter unit, a ceramic filter unit 125, and a reverse osmosis membrane feed water tank 126 storing treated water. The desalination unit 130 has a reverse osmosis membrane unit 131 and is supplied with the water treated by the ceramic filter unit.

Figure 2:
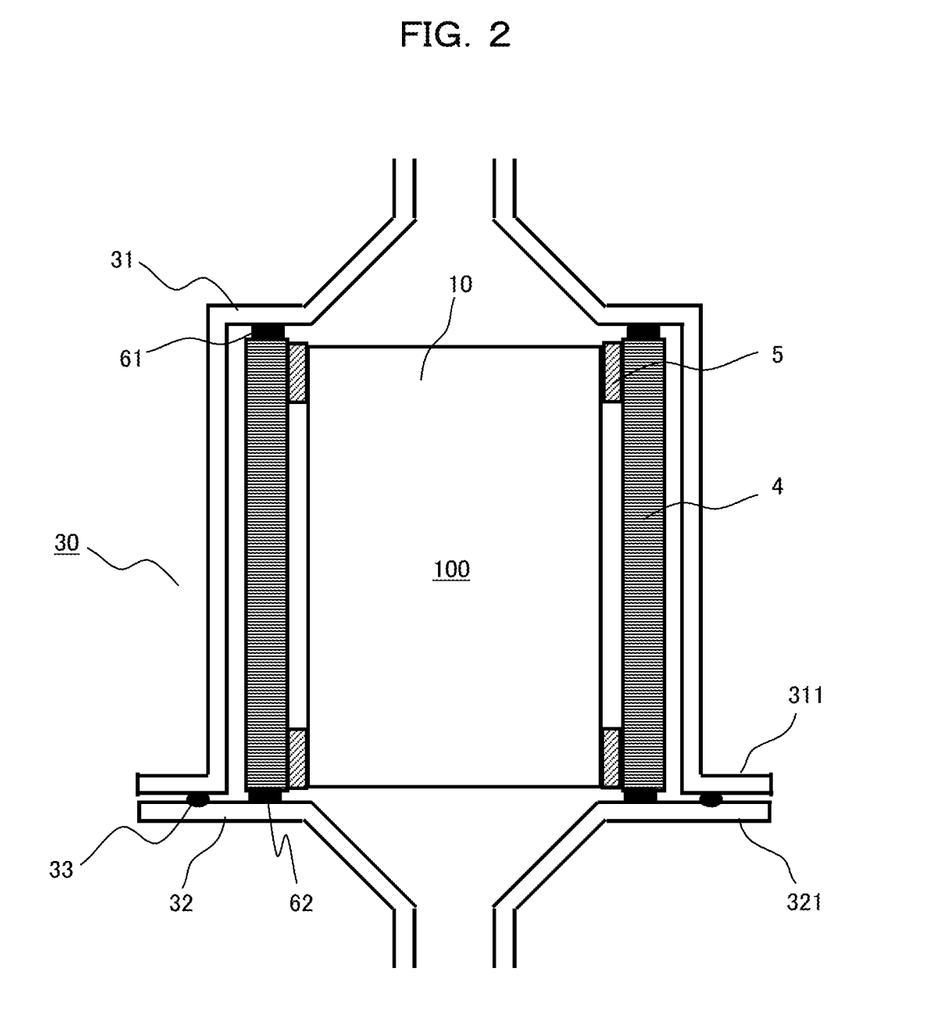
FIG. 2 is a side cross-sectional view illustrating the configuration of a ceramic filter unit of the first embodiment.

The ceramic filter unit 125 is the housing 30 in FIG. 2 that is provided with a valve (not illustrated) and a joint (not illustrated). The ceramic filter unit 125 is connected to the pump and the tank by piping. A pressure gauge (not illustrated), a flowmeter (not illustrated), and a security filter (not illustrated) are provided on the flow path.

Underwater organic matter adsorption was performed by water passage to the ceramic filter unit 125 and the water passage was performed upward from below and at a space velocity (SV) of 60/h to 180/h on the basis of the volume of the filter portion. Also included were a process of washing away foreign substances from the inflow side of the partition wall by regular reverse water flow and a process of performing adsorption performance recovery by washing adsorbates accumulated in the partition wall by means of the passage of a sodium hydroxide solution with a pH of 11 to 13.

[Comparative Example]

Figure 6A:
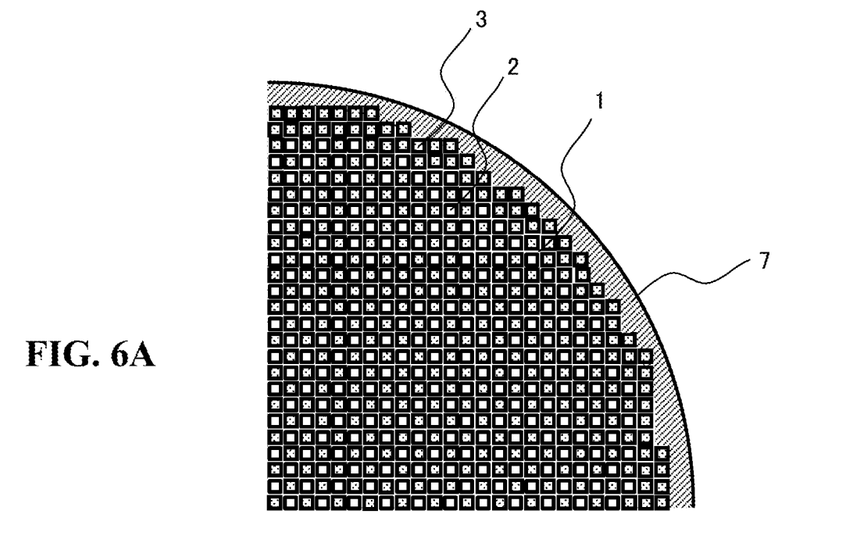
FIGS. 6A and 6B are diagrams illustrating a ceramic filter of a conventional example.
Figure 6B:
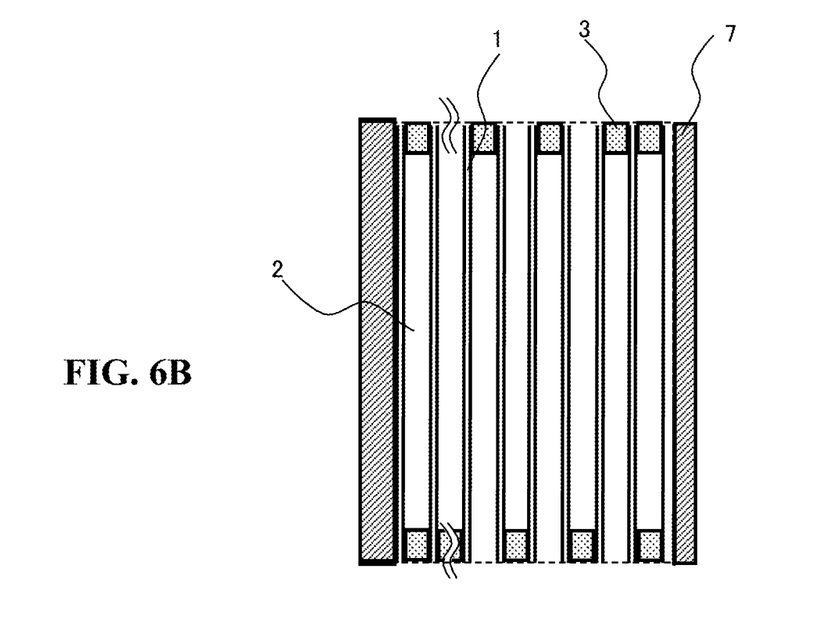

Here, the configuration of a conventional ceramic filter will be described with reference to FIGS. 6A and 6B for the purpose of describing a comparative example. The conventional example is similar to the ceramic filter described in Patent Document 1 and the filter portion is formed up to the plugged portion 3 as in the first embodiment. The flow path in the outer Peripheral portion seals both end surfaces in order to prevent feed water from escaping without passing through the partition wall. Subsequently, drying and firing were performed after an outer skin 7 was formed by ceramic slurry application to the outer peripheral portion for the purpose of preventing water leakage from side surface of the filter portion and adjusting external dimensions. The outer skin 7 is non-porous yet hydrous ceramic. The conventional example does not have the outer tube 4 or the seal material 5 in the present embodiment.

Figure 7:
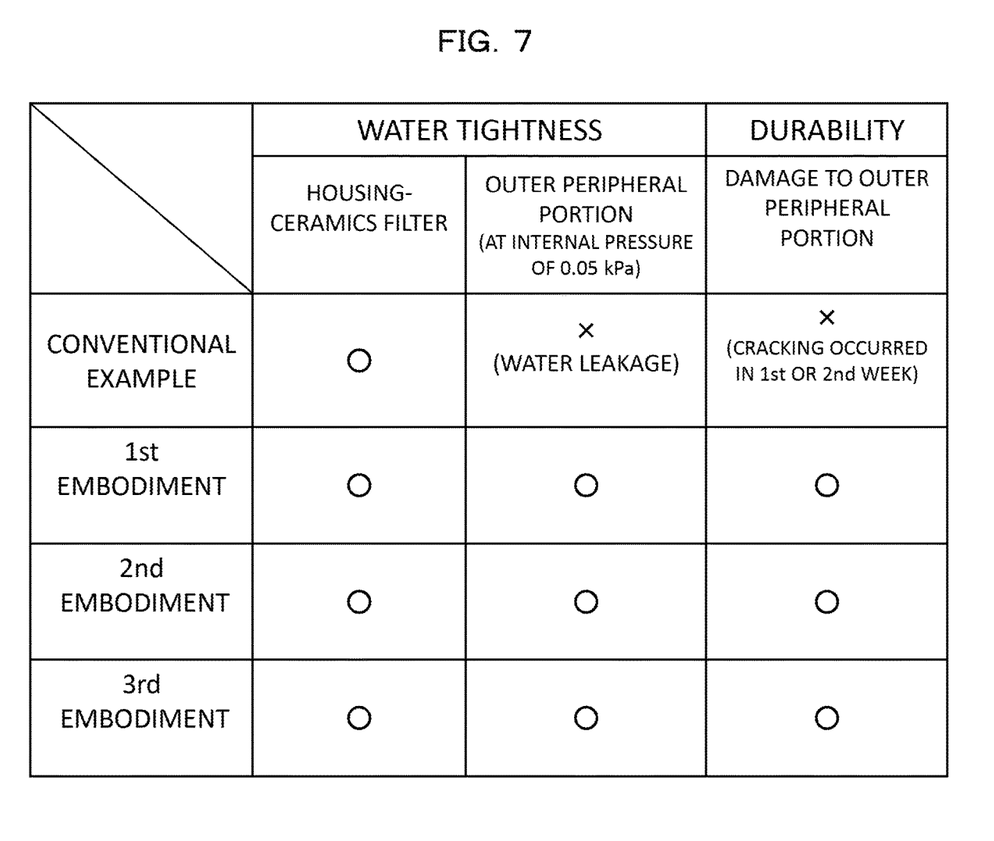
FIG. 7 is a table showing a comparative example of each embodiment.

FIG. 7 is a comparison table of results obtained when the conventional example and the first to third embodiments were applied to and operated in a seawater desalination system.

First, water leakage from the ring member part between the housing and the ceramic filter was evaluated regarding watertightness. A flat nitrile rubber packing was used for the ring member 6 for watertightness to be ensured between the housing and the ceramic filter and the crushing amount of the packing was determined such that a surface pressure of 0.2 MPa was reached. In the conventional example, the flat packing is in contact with the part of the flow path (sealed) of the outer peripheral portion and the ceramic outer skin.

Also evaluated regarding watertightness was water leakage from the outer peripheral portion of the ceramic filter. In the initial stage of the operation, the pressure loss of the filter portion is small and the internal pressure is 5 kPa or less. Clogging may occur in the filter portion as the operation continues for a long time. In this case, the internal pressure may rise to result in a differential pressure of 50 kPa or more in and out of the filter portion. At this time, the occurrence or nonoccurrence of water leakage from the outer peripheral portion of the ceramic filter was confirmed.

Evaluated regarding durability was whether the outer peripheral portion (the ceramic outer skin in the conventional example and the outer tube in the example) is damaged by the surface pressure given to the ceramic filter by the ring member 6 in the case of a continued operation.

The following was found from the result of comparison as illustrated in FIG. 7.

In the conventional example, there was no problem with the watertightness between the housing and the ceramic filter. However, the ceramic outer skin cracked and water leakage occurred before the end of the second week of the operation due to the surface pressure of the ring member for obtaining watertightness between the housing and the ceramic filter.

When the internal pressure exceeded 50 kPa, water leakage from the outer peripheral portion was observed despite the intactness of the ceramic outer skin. This is because the ceramic is hydrous. In the first to third embodiments, in contrast, the outer peripheral portion remained intact for one month or more. In addition, no water leakage from the outer peripheral portion was observed since the outer tube 4 is water-impermeable.

REFERENCE SIGNS LIST

1 Partition wall
2 Flow path
3 Plugged portion
4 Outer tube
5 Seal material
6, 61, 62 Ring member
7 Outer skin
10 Filter portion
100 Ceramic filter
30 Housing
31 Upper housing
32 Lower housing
33 Ring member
41, 51 Chamfered portion

The invention claimed is:

1. A method for manufacturing an adsorption structure, the method comprising:
   a plugged portion formation process of loading a plugged portion at one end on either one end side or the other end side of a filter portion formed in a tubular shape and having multiple flow paths divided by multiple partition walls made of porous ceramic;
   a loading process of loading the filter portion into a water-impermeable outer tube after the plugged portion formation process; and
   a seal material disposition process of disposing a seal material between the outer tube and the filter portion, and
   wherein the seal material is disposed by the seal material embedding between the outer tube and the filter portion after the loading process.

2. The method for manufacturing the adsorption structure according to claim 1,
   wherein the seal material is disposed such that blocking is performed between the outer tube and the filter portion by the filter portion being loaded into the outer tube after the seal material is attached to at least one end of the filter portion where the plugged portion is formed.

3. A method for manufacturing an adsorption structure unit comprising:
   a storage process of storing the adsorption structure manufactured by the manufacturing method according to claim 1 in a housing supplying feed water from one end and discharging the feed water from the other end; and a disposition process of disposing first ring members between end portions on both sides of the outer tube and an inner surface of the housing.

4. The method for manufacturing the adsorption structure unit according to claim 3, wherein a first housing on a side where feed water is supplied and a second housing on a side where the treated water is discharged constitute the housing, and a sealed structure is formed by the first housing and the second housing being fixed together via a second ring member different from the first ring members after the disposition process.

5. An adsorption structure produced by:

a plugged portion formation process of loading a plugged portion at one end on either one end side or the other end side of a filter portion formed in a tubular shape and having multiple flow paths divided by multiple partition walls made of porous ceramic;

a loading process of loading the filter portion into a water-impermeable outer tube after the plugged portion formation process; and a seal material disposition process of disposing a seal material between the outer tube and the filter portion, and wherein the seal material is disposed by the seal material embedding between the outer tube and the filter portion after the loading process.

6. The adsorption structure according to claim 5, wherein the seal material is disposed such that blocking is performed between the outer tube and the filter portion by the filter portion being loaded into the outer tube after the seal material is attached to at least one end of the filter portion where the plugged portion is formed.

7. A method for manufacturing an adsorption structure unit comprising:

a storage process of storing the adsorption structure produced according to claim 5 in a housing supplying feed water from one end and discharging the feed water from the other end; and a disposition process of disposing first ring members between end portions on both sides of the outer tube and an inner surface of the housing.

8. The method for manufacturing the adsorption structure unit according to claim 7, wherein a first housing on a side where feed water is supplied and a second housing on a side where the treated water is discharged constitute the housing, and a sealed structure is formed by the first housing and the second housing being fixed together via a second ring member different from the first ring members after the disposition process.

* * * * *